(12) United States Patent
Zhuang

(10) Patent No.: US 8,132,960 B2
(45) Date of Patent: Mar. 13, 2012

(54) DRINK SWINGING APPARATUS

(75) Inventor: Min Zhuang, Guangdong (CN)

(73) Assignee: Min Zhuang, Guangdong (CN)

( * ) Notice: Subject to any disclaimer, the term of this patent is extended or adjusted under 35 U.S.C. 154(b) by 914 days.

(21) Appl. No.: 12/159,454

(22) PCT Filed: Dec. 30, 2006

(86) PCT No.: PCT/CN2006/003712
§ 371 (c)(1),
(2), (4) Date: Jun. 27, 2008

(87) PCT Pub. No.: WO2007/076708
PCT Pub. Date: Jul. 12, 2007

(65) Prior Publication Data
US 2008/0304356 A1    Dec. 11, 2008

(30) Foreign Application Priority Data

Dec. 31, 2005  (CN) .............................. 200520121603
Feb. 16, 2006  (CN) .............................. 200620055102
Dec. 30, 2006  (CN) ................. PCT/CN2006/003712

(51) Int. Cl.
*B01F 11/00*    (2006.01)
(52) U.S. Cl. ........ 366/216; 366/213; 366/218; 366/209; 366/220

(58) Field of Classification Search ................. 366/216, 366/213, 214, 218, 209, 220, 210, 211
See application file for complete search history.

(56) References Cited

U.S. PATENT DOCUMENTS

| | | | | |
|---|---|---|---|---|
| 779,962 A | * | 1/1905 | Nobis ........................... | 366/149 |
| 1,085,450 A | * | 1/1914 | Lopez ........................... | 366/210 |
| 2,216,762 A | * | 10/1940 | Bolas ............................. | 62/381 |
| 2,499,203 A | * | 2/1950 | Warren ........................ | 366/275 |
| 3,181,841 A | * | 5/1965 | Boehm ........................ | 366/211 |
| 3,643,671 A | * | 2/1972 | Henninges et al. ........... | 134/118 |
| 6,314,751 B1 | * | 11/2001 | Gjersvik ...................... | 62/457.4 |
| 6,719,451 B1 | * | 4/2004 | Yue ................................ | 366/130 |
| 2004/0151064 A1 | * | 8/2004 | Yi ................................. | 366/209 |
| 2007/0289977 A1 | * | 12/2007 | Zhuang .................... | 220/592.16 |

FOREIGN PATENT DOCUMENTS

CN    2744258 Y  * 12/2005

* cited by examiner

*Primary Examiner* — Yogendra Gupta
*Assistant Examiner* — Ninh Le
(74) *Attorney, Agent, or Firm* — Steptoe & Johnson LLP

(57) ABSTRACT

A shaker is disclosed which is driven by a motor through a swing mechanism so as to swing a wine bottle, for example, drink within the bottle such as wine. The shaker comprises a base, a container, and a bottle seat disposed at a bottom in the container for receiving a bottle body, characterized in that the drink shaker further comprises a swing mechanism disposed in the base and driven by the motor through a conversion mechanism, and the swing mechanism is capable of driving the bottle seat to swing rightward and leftward in a plane or in different planes.

8 Claims, 4 Drawing Sheets

A-A

DRINK SWINGING APPARATUS

BACKGROUND OF THE INVENTION

1. Field of the Invention

The present invention relates to a drink swinging apparatus, and particularly to a drink bottle swing apparatus.

2. Description of the Related Art

Some people like drinking, especially in a festival. Drinking will enhance festive atmosphere. In addition, drinking manners vary depending upon wines. Generally, fragrance can apparently emanate from dry wine after breathing (commonly called wine breathing) by contact with air for a period of time. The breathing is carried out for wine with lower aging so as to release undesired smell and foreign substance and so as to make strong fragrance of the wine prominent. The breathing is carried out for aged wine so that fragrance can emanate from the sealed wine which is aged by means of oxidation. Therefore, before drinking, a bottle cap of grape wine or other fruit wines often needs to be opened and to be swung so that the wine at a bottom within the bottle is alternatively turned up to a surface of the wine where it sufficiently and fully contacts with air, and the undesired smell volatilizes. As a result, the breathing of the wine is accomplished, and a pure and nice taste of the wine is obtained. However, in order to make some wines pure and smooth in taste, the wines should be warmed or iced. For example, people like drinking Shao-Hsing rice wine (Chinese yellow wine) or Japanese sake at a high temperature, and beer or aquavit at a low temperature.

Accordingly, the people will prepare wines in such a manner that varies depending upon wines. Some people may pour wine in a bottle into another container so that the wine can be laid aside or a period of time so as to sufficiently and fully contact with air and to volatilize undesired smell. In other words, breathing process is performed for the wine. Some people may place a bottle with wine therein into a barrel with ice therein to be cooled. Other people may warm the bottle with wine therein in a container. Not only the undesired smell is difficult to be volatilized, but also it is difficult for the wine to be uniformly warmed or cooled in all the manners. In addition, the above manners lack inspiration, and can not add inspiration and joy into the drinking atmosphere.

SUMMARY OF THE INVENTION

The present invention is made to solve at least one aspect of the problem existing in the prior art.

It is an object of the present invention to provide a shaker which swings a wine bottle in a reciprocation manner so as to speed up breathing of wine, and can move to excite appetite for drinking.

It is another object of the present invention to provide a shaker which can cool or warm wine and speed up a process of cooling or warming the wine by mixing a cooling or warming liquid contained in a container by swinging the wine bottle with less energy consumption during a process of breathing.

It is still another object of the present application to provide a shaker which has less friction force and can effectively reduce noise, which is generated by components of the shaker, in use, In order to achieve at least one aspect of the above objects, there is provided a drink shaker. The drink shaker comprises a base, a container, a bottle seat disposed at a bottom in the container for receiving a bottle body therein, and a swing mechanism disposed in the base and driven by a motor. The swing mechanism is capable of driving the bottle seat to swing rightward and leftward in a plane or in different planes. A seal sheet is made of a flexible material, fixed between the container and the base, and provided at an edge of the seal sheet with a corrugation. The corrugation can be stretched so as to accommodate a swing of a center of the seal sheet. The seal sheet is fixed to the bottle seat on a side of the seal sheet, a tray is fixed on the other side of the seal sheet, and the swing mechanism drives the bottle seat through the tray to swing.

With the above configuration, when a wine bottle is opened and placed in the bottle seat, the wine bottle will swing with the bottle seat so that wine in the bottle is continuously exchanged between an upper layer and a lower layer and contacts with air, and so that undesired smell is volatized. Also, the process of shaking the wine can be viewed so as to excite appetite for drinking.

In an aspect of the present invention, the swing mechanism may be a swing rod. The swing rod is driven by the motor through a crank to swing. The swing rod has an upper portion connected with a bottom of the bottle seat. With this solution, the bottle seat can swing rightward and leftward about a central vertical line. The shaker has a simple configuration. Alternatively, the swing mechanism may be composed of a rotary disk and an adjustment component disposed on the rotary disk. With this solution, an edge of the bottom of the bottle seat will be raised and lowered consecutively and alternatively so that the wine in the bottle is continuously thrown. As a result, the wine is sufficient mixed and exchanged between an upper layer and a lower layer.

In an aspect of the present invention, in order to ice or warm wine, a seal sheet of a flexible material is fixed between the container and the base so as to isolate the container from the base for the purpose of preventing the liquid contained in the container from flowing into the base. The seal sheet is also fixed to the bottle seat on a side of the seal sheet. In addition, a tray is provided. The tray is fixed on the other side of the seal sheet. An action of the adjustment component of the rotary disk of the swing mechanism can be transferred to the bottle seat through the tray.

With the above solution, ice water or warm water can be contained in the container and mixed by swinging of the wine bottle so that the water is uniform in temperature, thereby accelerating a process of warming or cooling the wine. Furthermore, power consumption for swinging the wine bottle reduces due to buoyancy of the liquid.

According to an aspect of the present invention, the adjustment component of the rotary disk may be a truckle, or a slope formed on the rotary disk. The truckle or the slope acts on the bottle seat or the tray so that a portion of the bottle seat or the tray raised by the truckle or the slope becomes higher than other portions. Different points at an edge of the bottle seat or the tray are raised in sequence by rotating the rotary disk.

According to an aspect of the present invention, an annular slide groove is formed in an upper surface of the rotary disk, another annular slide groove is formed in a lower surface of the bottle seat or the tray so as to correspond to the annular slide groove of the rotary disk, and balls are disposed in the grooves; and an annular slide groove is formed in a lower surface of the rotary disk, another annular slide groove is formed in an upper portion of the base so as to correspond to the annular slide groove formed in the lower surface of the rotary disk, and balls are also disposed in the grooves. The above configuration can reduce resistance to the rotary disk during the rotation of the rotary disk and circumscribe positions of the rotary disk, the tray, and the bottle seat.

According to an aspect of the present invention, in order to reduce noise generated during the swinging of the wine bottle, a recess having a shape of a spherical surface is recessed down into the tray at a center of the tray. A through hole is formed through the tray at the center of the tray, a through hole is formed through the rotary disk at a center of the rotary disk, and a through hole is formed through the upper portion of the base at a center of the upper portion of the base. A nail-shaped member having a spherical surface is provided. The spherical surface of the nail-shaped member matches with the recess having the shape of a spherical surface. In addition, a diameter of the through hole of the tray is greater than a diameter of a shaft of the nail-shaped member. Therefore, the nail-shaped member constrains the recess of the tray, the rotary disk, and the upper portion of the base by cooperation with the adjustment component.

With the above configuration, a positional relationship between the tray and the rotary disk can be further constrained. In addition, with the above configuration and the slope of the rotary disk, the slide grooves and the balls, the tray is always parallel to the slope of the rotary disk so that friction force against the rotation of the rotary disk can be reduced and the noise of the shaker in use can be degraded.

According to an aspect of the present invention, a heating element and a temperature controlling element are disposed in the container. When the shaker is used to warm wine, the heating element heats warming liquid and the temperature controlling element controls a temperature of the warming liquid.

According to an aspect of the present invention, a water jetting device or a mist spraying device is disposed in the container. This will improve visual sense of the wine shaker, and adds interests and joyness to the people during the swinging of the bottle. Also, it achieves the flowablity of the water in the wine shaker.

According to an aspect of the present invention, a decorative lamp is disposed to the container. Light from the lamp can make jetting and spraying of water, and the swinging of the bottle prominent to the observers.

The shaker according to the present invention swings a wine bottle in a reciprocating motion manner so as to bring about movement effect during breathing of wine, which can excite people's appetite for drinking where the novel characteristic of the shaker exhibits.

The novel shaker according to the present invention enables wine to be mixed uniformly and facilitates continuous and quick exchange of wine between the upper layer and the lower layer and contact of the wine with air so as to speed up the breathing process by means of the reciprocating swinging motion of the wine bottle.

The novel shaker according to the present invention can mix the cooling liquid or the warming liquid in the container uniformly by means of continuous swinging of the bottle. As a result, the wine can be quickly cooled or warmed. In addition, the weight of the wine bottle can be counteracted by buoyancy. Therefore, power for swinging the wine bottle can be reduced and energy consumption of the shaker can be saved.

DETAILED DESCRIPTION OF THE PREFERRED EMBODIMENTS

The present invention will be further described in detail in conjunction with the accompanying drawings.

Embodiment 1

Figure 1:
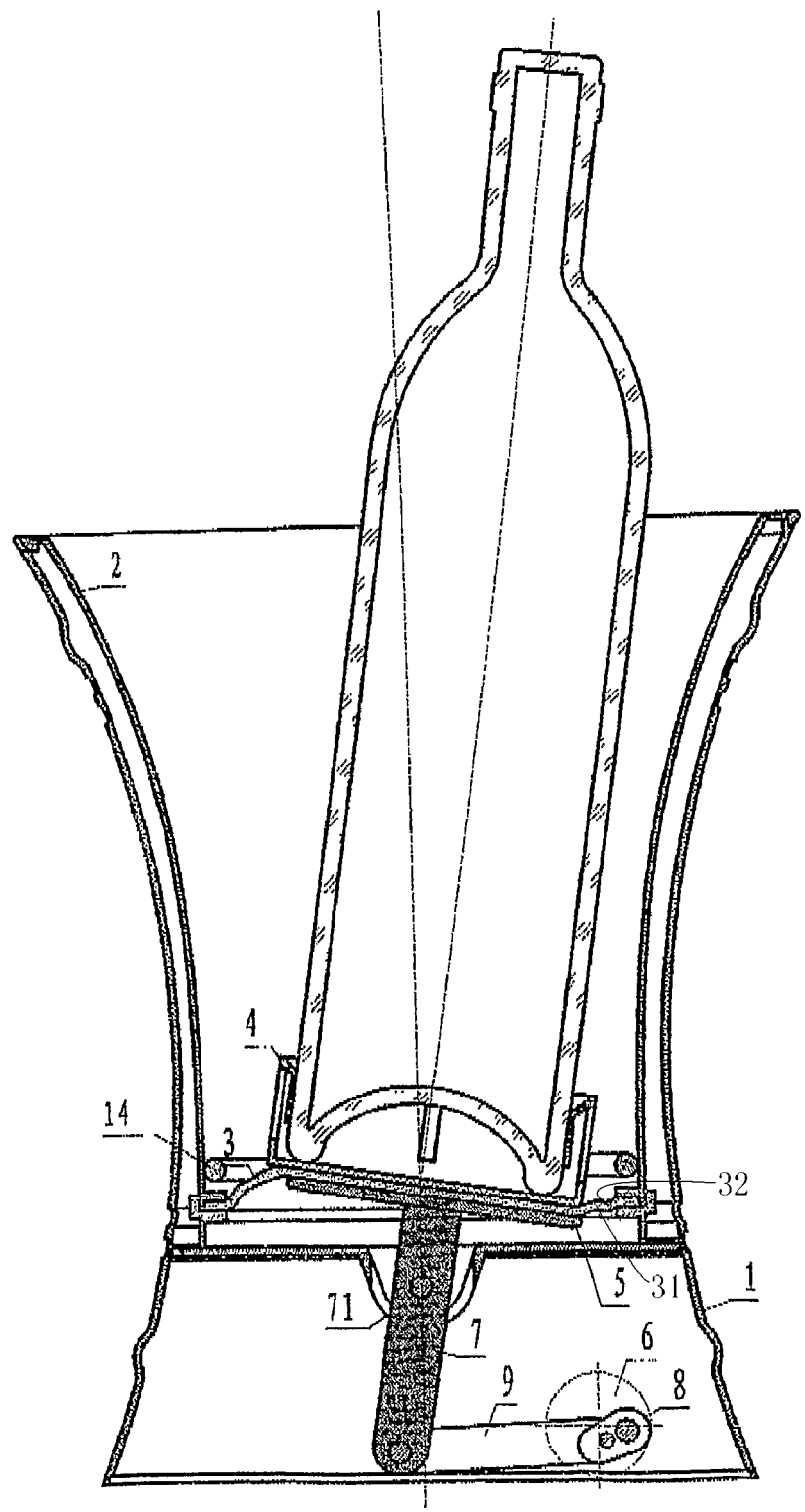
FIG. 1 is a schematic view showing a shaker according to an embodiment of the present invention.

A shaker of the first embodiment of the present invention is configured to swing a wine bottle rightward and leftward in a plane in the embodiment 1. Referring to FIG. 1, the shaker comprises a base 1, a container 2, a seal sheet 3, a bottle seat 4, a tray 5, a motor 6, a swing rod 7, a crank 8, a link 9, a tubular electric heating element 14, and a temperature controlling element (not shown). A seal sheet 3 is disposed to isolate the base 1 from the container 2 for the purpose of preventing a liquid contained in the container 2 from flowing into an inside of the base 1. The seal sheet 3 is made of a flexible material and is provided at an edge 31 thereof with a corrugation 32. The corrugation 32 can be stretched so as to accommodate or adapt to a movement of a center of the seal sheet 3. The swing rod 7 is fixed to the base 1 through a shaft 71 so as to swing rightward and leftward around the shaft 71. The electrical motor 6 can drive the swing rod 7 through the crank 8 and the link 9 to swing rightward and leftward. The bottle seat 4 and the tray 5 are fixed to an upper surface and a lower surface of the seal sheet 3, respectively. The tray 5 is fixed to an upper portion of the swing rod 7 at a lower surface of the tray 5.

In operation, a wine bottle is placed on the bottle seat 4, and mixture of ice and water, or warm water is poured into the container 2. When the electrical motor 6 is started, the motor 6 drives the tray 5 through the crank 8 to swing rightward and leftward. The tray 5 drives a center portion of the seal sheet 3 and the bottle seat 4 to swing. While the wine bottle swings with the bottle seat 4, the water in the container is agitated, and at the same time, wine in the bottle is continuously mixed and sufficiently contacted with air so as to be oxidized by means of the swinging. Furthermore, the water in the container is agitated to be uniform in temperature by means of the swinging of the wine bottle, thereby cooling or warming the wine quickly.

Embodiment 2

Figure 2:
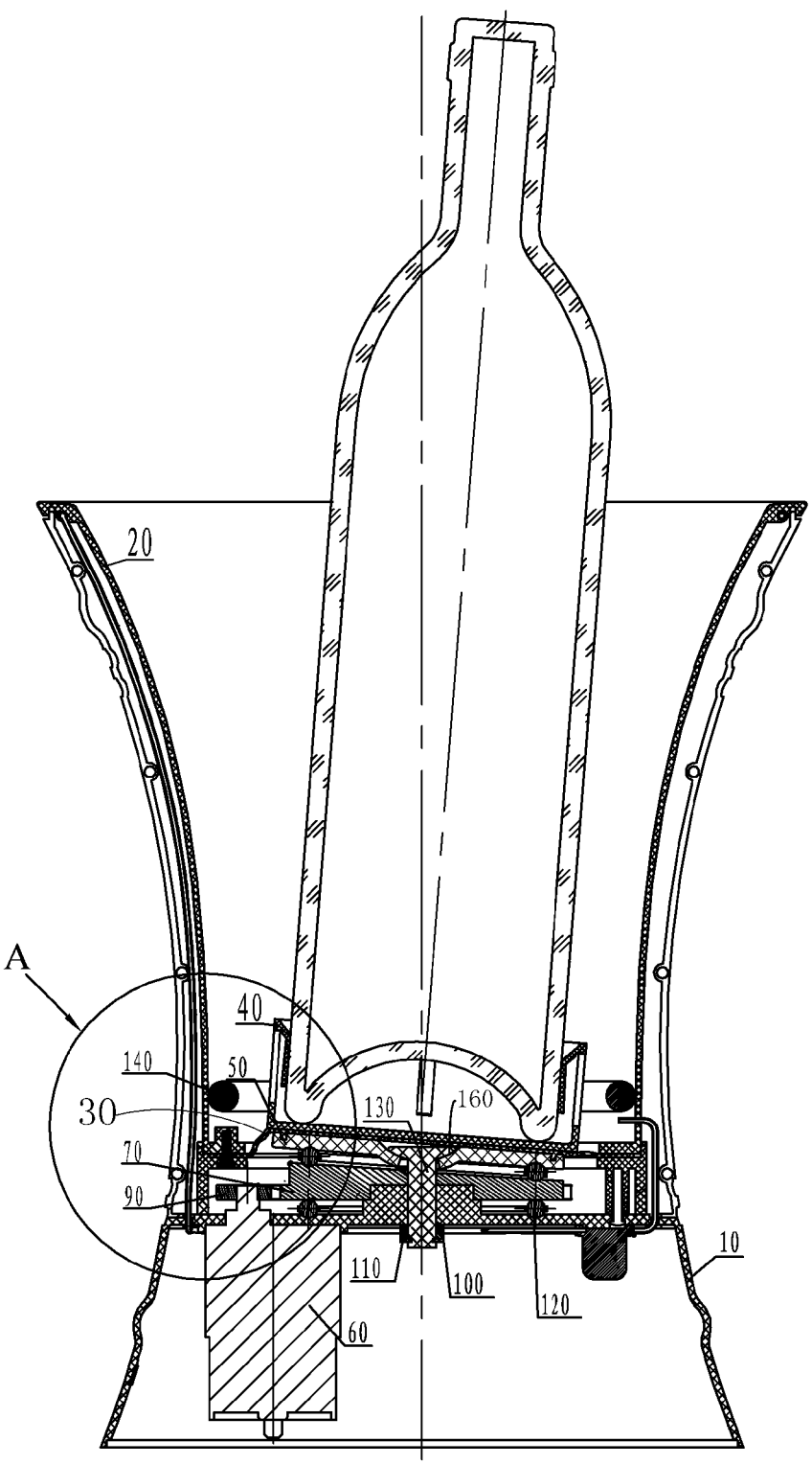
FIG. 2 is a schematic view showing a shaker according to another embodiment of the present invention.
Figure 3:
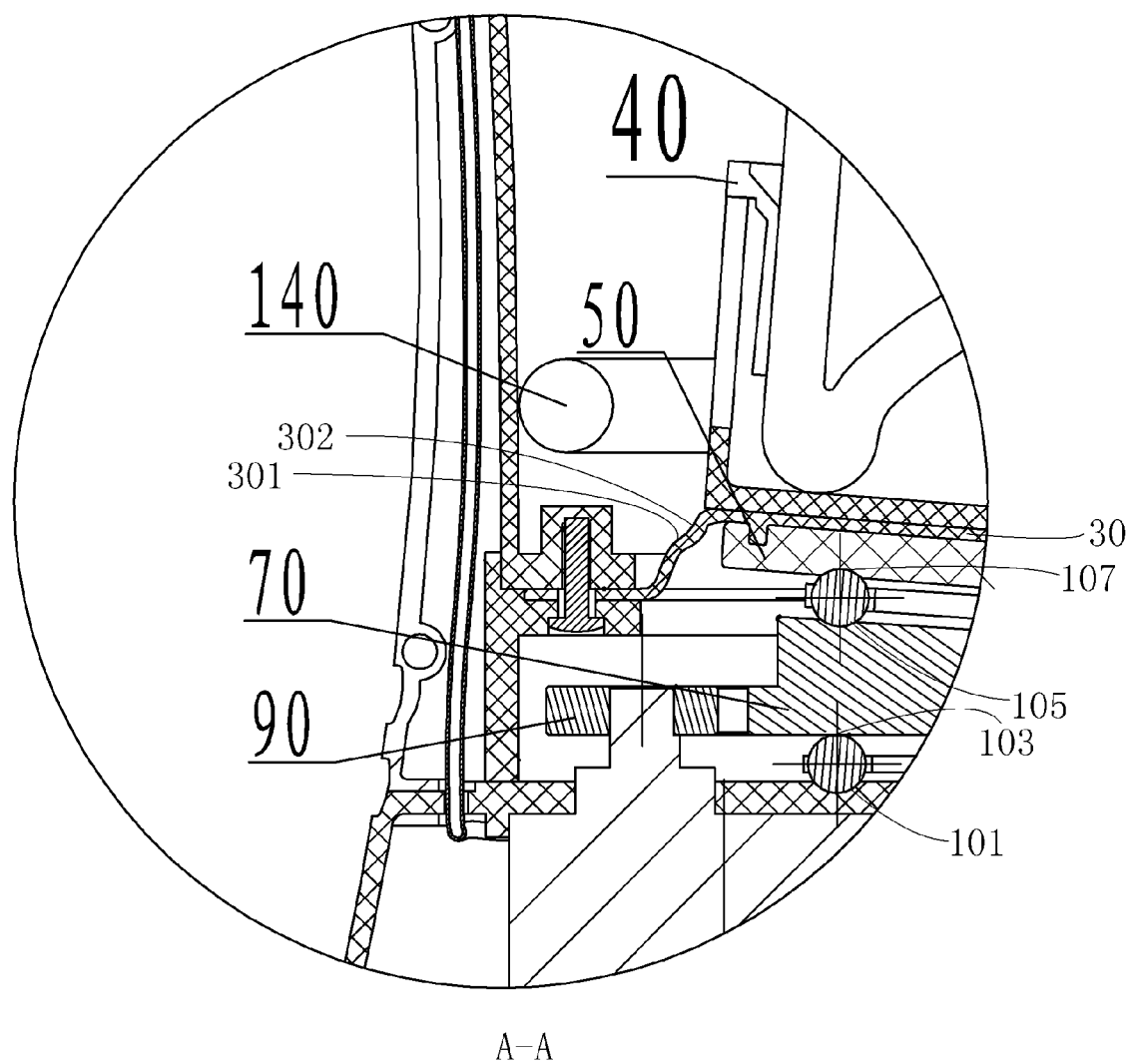
FIG. 3 is an enlarged schematic view showing the portion A of FIG. 2.
Figure 4:
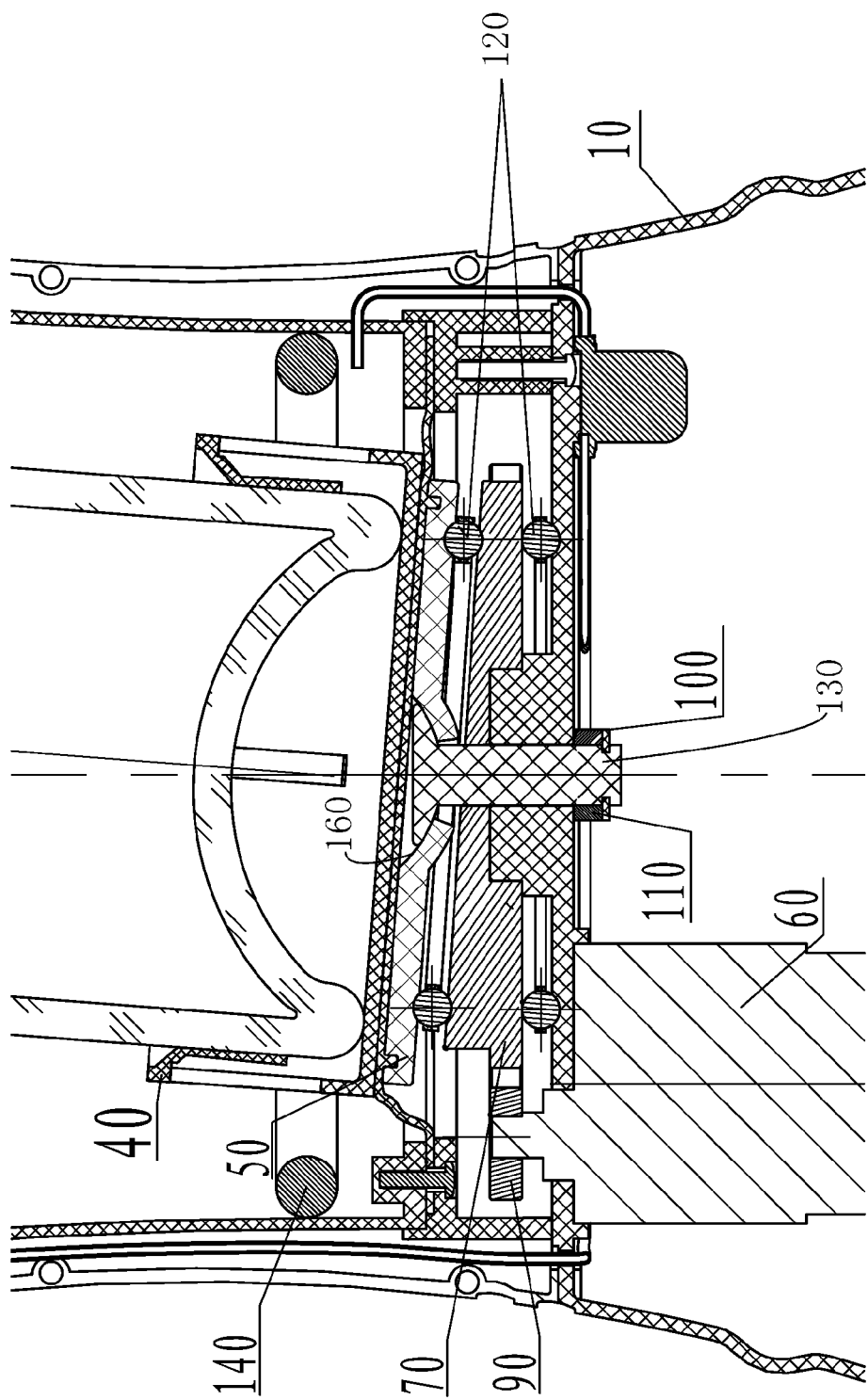
FIG. 4 is an enlarged schematic view showing a portion of FIG. 2.

A shaker of a second embodiment of the present invention is configured to swing a wine bottle rightward and leftward in different planes in the embodiment 2. Referring to FIGS. 2-4, the shaker comprises a base 10, a container 20, a seal sheet 30, a bottle seat 40, a tray 50, a motor 60, a rotary disk 70, a nail-shaped member 130 having a spherical surface, a gear 90, a washer 100, a spring 110, balls 120, a tubular electric heating element 140, and a temperature controlling element (not shown). The electrical motor 60 drives the gear 90 to rotate. The rotary disk 70 is rotated by engagement between the gear 90 and the rotary disk 70. The seal sheet 30 is made of a flexible material and is provided at an edge 301 thereof with a corrugation 302.

In order to rotate the rotary disk 70 smoothly, annular grooves 101, 103, 105 and 107 are formed at corresponding positions of the rotary disk 70, the tray 50, and the base 10, respectively. Specifically, the annular slide groove 105 is formed in an upper surface of the rotary disk 70, the other annular slide groove 107 is formed in a lower surface of the bottle seat 40 or the tray 50 so as to correspond to the annular slide groove 105 in the upper surface of the rotary disk 70, and the balls 120 are disposed in the grooves 105 and 107; and the annular slide groove 103 is formed in a lower surface of the rotary disk 70, the other annular slide groove 101 is formed in an upper portion of the base 10 so as to correspond to the annular slide groove formed in the lower surface of the 8 rotary disk 70, and the balls 120 are also disposed in the grooves 101 and 103.

A slope is formed on the upper surface of the rotary disk 70. In other words, the upper surface of the rotary disk 70 is configured to have higher and lower portions, as an adjustment component. A truckle (not shown) may be disposed at a bottom of the bottle seat or the tray as an alternative configuration of the adjustment component.

A recess 160 having a shape of a spherical surface is recessed down into the tray 50 at a center of the tray 50. A through hole is formed in the tray 50 at the center of the tray, a through hole is formed in the rotary disk 70 at a center of the rotary disk 70, and a through hole is formed in the upper portion of the base 10 at a center of the upper portion of the base. A nail-shaped member 130 having a spherical surface is provided. The spherical surface of the nail-shaped member is fitted with the recess 160 having the shape of a spherical surface. In addition, a diameter of the through hole of the tray is greater than a diameter of a shaft of the nail-shaped member. Therefore, when the nail-shaped member 130 is fitted into the recess 160, the nail-shaped member 130 constrains the recess 160 of the tray 50, the rotary disk 70, and the upper portion of the base 10 by cooperation with the adjustment component. Specifically, the recess 160 of the tray 50, the rotary disk 70, and the upper portion of the base 10 are constrained by fitting the nail-shaped member 130 with the washer 100 and the spring 110.

Since the through hole of the rotary disk 70 is greater than the shaft of the nail-shaped member in diameter, the try 50 is located above the rotary disk 70 and is kept to be parallel to the slope of the rotary disk 70. In other words, when the rotary 70 rotates, positions of the tray 50 and the rotary disk 70 can be adjusted so that the tray 50 is kept to be parallel to the slope of the rotary disk 70 since the recess 160 having the spherical surface is fitted with the nail-shaped member 130 with a clearance between the through hole of the rotary disk 70 and the shaft of the nail-shaped member. Therefore, when the rotary disk 70 rotates, an edge of the tray 50 is continuously raised at positions along the edge in sequence and at the same time, opposite sides of a corrugation of the seal sheet 30 are alternatively stretched. When the tray 50 rotates in a state that the tray is inclined, the bottle seat 40 rotates accordingly so that the wine bottle carries out a 360-degree swing motion.

In an embodiment, a heating element and a temperature controlling element are disposed in the container 20. When the shaker is used to warm wine, the heating element can heat warming liquid to be heated and the temperature controlling element controls a temperature of the warming liquid.

In another embodiment, a water jetting device or a mist spraying device (not shown) is disposed in the container 20. This will improve visual sense of the wine shaker, and adds interests and joyness to the people during the swinging of the bottle. Also, it achieves the flowablity of the water in the wine shaker. In a further embodiment, a decorative lamp (not shown) is disposed to the container 20. Light from the lamp can make jetting and spraying of water, and the swinging of the bottle prominent to the observers.

Although a drink shaker of the present invention is described with respect to a wine bottle as an example, it apparently can be used to other drinks, such as carbonated drinks, coffee drinks, tee drinks, contained in bottles or those similar to the bottles.

The above embodiments have described two embodiments and configurations of the swing mechanism. In fact, the swing mechanism can be configured in the other ways and configurations. Therefore solutions in which the swing mechanism is embodied in the other ways naturally fall within the scope of the present invention. In other words, the two types of swing mechanism should not be construed as a limitation of the scope of the present application.

The invention claimed is:

1. A drink shaker comprising:
a base, a container, and a bottle seat disposed at a bottom in the container for receiving a bottle body, characterized in that the drink shaker further comprises a swing mechanism disposed in the base and driven by a motor, the swing mechanism is capable of driving the bottle seat to swing rightward and leftward in a plane or in different planes; and
a seal sheet made of a flexible material, fixed between the container and the base, and provided at an edge of the seal sheet with a corrugation;
wherein the corrugation can be stretched so as to accommodate a swing of a center of the seal sheet, and the bottle seat is fixed to a surface of the seal sheet, a tray is fixed on the other surface of the seal sheet, and the swing mechanism drives the bottle seat through the tray to swing.

2. The drink shaker according to claim 1, characterized in that the swing mechanism is composed of a rotary disk and an adjustment component disposed on the rotary disk.

3. The drink shaker according to claim 2, characterized in that the adjustment component of the rotary disk can be a truckle, or a slope formed on the rotary disk, and the truckle or the slope acts on a bottom of the bottle seat or the tray.

4. The drink shaker according to claim 3, characterized in that an annular slide groove is formed in an upper surface of the rotary disk, another annular slide groove is formed in an upper surface of the bottle seat or the tray so as to correspond to the annular slide groove formed in the lower surface of the rotary disk, and balls are disposed in the grooves; and an annular slide groove is formed in a lower surface of the rotary disk, another annular slide groove is formed in an upper portion of the base so as to correspond to the annular slide groove formed in the lower surface of the rotary disk, and balls are also disposed in the grooves.

5. The drink shaker according to claim 4, characterized in that:
a recess having a shape of a spherical surface is recessed down into the tray at a center of the tray, a through hole is formed through the tray at the center of the tray, a through hole is formed through the rotary disk at a center of the rotary disk, and a through hole is formed through the upper portion of the base at a center of the upper portion of the base;
a nail-shaped member having a spherical surface is provided, and the spherical surface of the nail-shaped member matches with the recess having the shape of a spherical surface;
a diameter of the through hole of the tray is greater than a diameter of a shaft of the nail-shaped member; and
the nail-shaped member constrains the recess of the tray, the rotary disk, and the upper portion of the base by cooperation with the adjustment component.

6. The drink shaker according to claim 5, characterized in that a heating element and a temperature controlling element are disposed in the container.

7. The drink shaker according to claim 5, characterized in that a water jetting device or a mist spraying device is disposed in the container.

8. The drink shaker according to claim 5, characterized in that a decorative lamp is disposed on the container.

\* \* \* \* \*